Sept. 17, 1935.  G. W. BAUGHMAN  2,014,875
SPEED CONTROLLED BRAKE
Filed Dec. 20, 1933
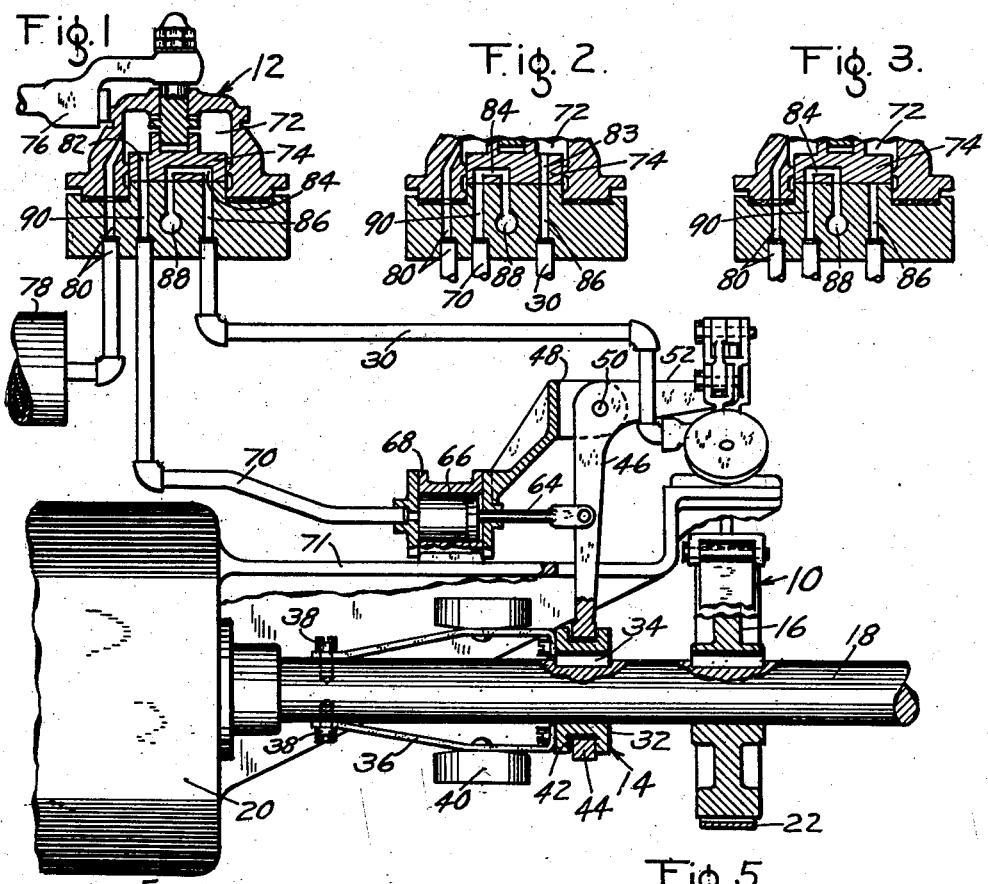
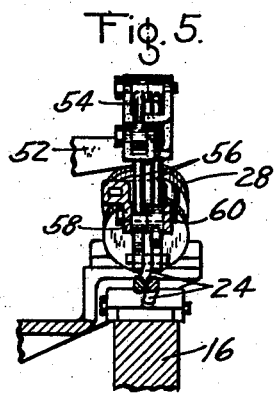
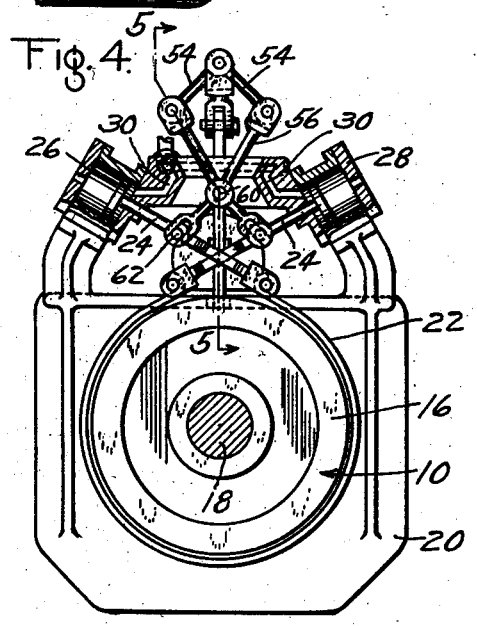
INVENTOR
GEORGE W. BAUGHMAN
BY
ATTORNEY Patented Sept. 17, 1935

2,014,875

UNITED STATES PATENT OFFICE 2,014,875

SPEED CONTROLLED BRAKE

George W. Baughman, Edgewood, Pa., assignor to The Westinghouse Air Brake Company, Wilmerding, Pa., a corporation of Pennsylvania Application December 20, 1933, Serial No. 703,229

16 Claims. (Cl. 188—181)

This invention relates to vehicle brakes, and more particularly to brake apparatus in which the braking force is regulated in part by the speed of the vehicle.

It is a general object of this invention to provide a fluid pressure operated brake device, which is also simultaneously operable by centrifuge means to produce an increased braking force at the higher speeds which diminishes as the speed of the vehicle diminishes.

Another object of my invention is to provide a brake apparatus of this character, in which the brake is mechanically operated by a centrifuge means independently of operation of the brake by fluid pressure means, and in which the centrifuge means may be rendered inoperative at any speed by auxiliary fluid pressure means, so that a release of the brake may be effected at any desired time.

Another object is to provide a brake device operable by both fluid pressure means and centrifuge means, in which upon a failure of the fluid pressure means the centrifuge means immediately becomes operable to actuate the brake.

More specific objects, as well as other important advantages, will appear from the following description, which is illustrated in the attached drawing, in which, Fig. 1 is a diagrammatic representation of one embodiment of my invention.

Fig. 2 is a diagrammatic illustration of the brake valve device in the position for effecting an application of the brake, Fig. 3 is a similar view showing the brake valve device in lap position.

Fig. 4 is an end view, partly in section, of the brake device shown in Fig. 1, as viewed from the right.

Fig. 5 is a view substantially along the line 5—5 of Fig. 4.

According to the embodiment shown in the drawing, I have provided a brake device 10 of the type operable by fluid under pressure supplied thereto, which is controlled by a brake valve device 12, and which is also mechanically operable by a centrifuge device 14.

The brake device 10 is provided with a brake drum or rotor 16 which is shown as rigidly secured to a shaft 18 of a driving motor 20, but which may be secured to any rotating part which rotates as the vehicle moves. Coacting with the brake drum 16 is a brake band 22, the ends of which are suitably connected to connecting rods 24 associated with pistons 26 in brake cylinders 28. Fluid under pressure is supplied to the brake cylinders 28 through pipe and passages 30, so as to actuate the pistons 26 in a direction to cause the brake band 22 to frictionally engage the rotor 16 to produce a braking effect thereon.

The centrifuge device 14 is provided with a collar 32 axially slidable on the shaft 18, but rotatable therewith through an interlocking key 34. Secured to the collar 32 are flexible members 36, which have one end thereof rigidly secured to the shaft 18 as by screws 38. Intermediate the ends of the flexible members 36 are secured centrifuge weights 40. As the shaft 18 rotates the centrifuge weights 40 will be thrown outwardly by centrifugal force a distance in accordance with the speed of rotation of the shaft. This outward movement of the weights 40 will slide the collar 32 axially of the shaft, in a manner which is well known.

The collar 32 is provided with an annular slot 42 with which is interfitted a ring member 44 on the end of a bell crank lever 46. The bell crank lever 46 is pivotally mounted in a bracket 48, at 50. An arm 52 of the bell crank lever is operably associated with the brake band 22 through links 54 and levers 56. The levers 56 are pivotally supported from a bracket 58, at 60. One end of each of the levers 56 is bifurcated to form a slot for receiving pins 62 secured to the connecting rods 24 intermediate their ends, so that when the bell crank lever 46 is rotated in a clockwise direction, as by movement of the collar 32 to the left, the levers 56 will be actuated to move the connecting rods 24 in the same direction as when fluid under pressure is supplied to the brake cylinders 28, and thus cause the brake band 22 to frictionally engage the rotor 16.

Intermediate its pivot 50 and the end provided with the ring 44, the bell crank lever 46 is connected to a piston rod 64 associated with a piston 66 operatively mounted in an auxiliary cylinder 68. The auxiliary cylinder 68 is adapted to have fluid under pressure supplied thereto by pipe 70. With fluid pressure in the cylinder 68, the piston 66 is moved to is extreme right hand position, as is illustrated in Fig. 1, thus overbalancing the force exerted upon the bell crank lever 46 by action of the centrifuge weights 40, and thereby rendering the centrifuge device ineffective to operate the brake device 10. The auxiliary cylinder 68 and the mechanism for actuating the brake band 22 may be supported from a bracket 71 associated with the motor 20, or with some other rigid part.

The brake valve device 12 comprises a casing having a rotary valve chamber 72, containing a rotary valve 74 adapted to be operated by movement of a handle 76. The valve chamber 72 is in constant communication with a source of fluid under pressure, as for example, a reservoir 78, by pipe and passage 80.

In operation, when the brake valve handle 76 is in release position, as shown in Fig. 1, port 82 registers with a passage 90 leading to pipe 70, thereby permitting fluid under pressure to be supplied from reservoir 78 and valve chamber 72 to the auxiliary cylinder 68, and thus rendering the centrifuge device 14 inoperative. Also, cavity 84 connects passage 86 to exhaust passage 88, so that the brake cylinders 28 are vented to the atmosphere through pipe 30. The brake is therefore held in release position.

When the vehicle is in motion so that shaft 18 is rotating, and it is desired to effect an application of the brake, the handle 76 is moved to application position, as shown in Fig. 2, in which port 83 registers with passage 86. Fluid under pressure is then supplied from the valve chamber 72 and reservoir 78 through pipe 30 to the brake cylinders 28. The brake band 22 is thus caused to frictionally engage the brake drum 16 with a pressure in accordance with the fluid pressure supplied to the brake cylinders 28.

In application position of the brake valve device, passage 90 is connected to the exhaust passage 88 by cavity 84, so that fluid is vented from the auxiliary cylinder 68 to the atmosphere. With the release of fluid pressure from the auxiliary cylinder 68, centrifuge weights 40 will move outwardly a distance in accordance with the speed of rotation of the shaft 18, thereby moving the collar 32 axially to the left on the shaft 18 and causing the bell crank lever 46 to be rotated in a clockwise direction to apply an additional force to the brake band 22 in accordance with the centrifugal force produced by the rotation of the centrifuge weights 40. The brake will, therefore, be applied with an increased braking force proportional to the speed at which the vehicle is moving.

As the vehicle decelerates, the coefficient of friction between the brake band and brake drum increases. The braking force, however, decreases as the speed of the vehicle diminishes, due to the fact that the centrifugal force of the centrifuge weights 40 diminishes. By reducing the braking force as the speed of the vehicle reduces, a substantially constant rate of retardation is maintained, and thereby skidding of the wheels is prevented.

Should the wheels begin to skid, however, as for example if the track condition changes, the shaft 18 will cease rotating, whereupon the centrifuge device immediately becomes inoperative to provide a braking force. The braking force would, therefore, be immediately diminished to that produced by the fluid pressure means, which may be regulated manually by the operator so as not to produce skidding of the wheels. As the wheels commence rotating again, the centrifuge device again becomes operative to provide a braking force, but if the brake is held applied by fluid under pressure the vehicle will be constantly decelerating, so that the effect of the centrifuge device will be constantly diminishing. It will be obvious, therefore, that the braking force produced by the centrifuge device is constantly diminished, so that the danger of wheel skidding is greatly minimized and any tendency to skid is virtually self-correcting.

The supply of fluid under pressure to the brake cylinders 28 may be controlled at any time by movement of the handle 76. For example, if it is desired to lap the supply of fluid to the brake, the handle is moved to lap position, as shown in Fig. 3, in which the cavity 84 continues to connect passages 88 and 90, and the supply of fluid to the brake cylinder passage 86 is cut off. The control of the supply of fluid under pressure to the brake cylinders is, therefore, effected independently of actuation of the brake by the centrifuge device. Or conversely, the centrifuge device operates according to the speed of the vehicle, and not according to the position of the handle 76, except when effecting a release of the brake.

When it is desired to effect a release of the brake, the brake valve handle 76 is moved to release position, as shown in Fig. 1, in which position, as before described, the centrifuge device is rendered inoperative and fluid pressure in the brake cylinders 28 is released to the atmosphere.

When the vehicle has been brought to a stop, it may be held at rest by supplying fluid under pressure to the brake cylinders by operation of the brake valve handle 76, as during this period the centrifuge device is, of course, inoperative.

It will thus be seen, that I have provided a brake apparatus in which a maximum braking force may be produced at high speeds which is automatically reduced as the speed of the vehicle diminishes, and in which the tendency of the wheels to skid acts to correct itself to minimize the danger of wheel skidding.

While I have shown and described one specific embodiment of my invention, it is to be understood that many other embodiments thereof may be made, and I do not therefore desire to be limited other than by the scope and spirit of the appended claims.

Having now described my invention, what I claim as new and desire to secure by Letters Patent, is:

1. In a vehicle brake apparatus, the combination with a brake cylinder, of a centrifuge device operable by the speed of a vehicle to produce a braking force and operable by the supply of fluid under pressure thereto to diminish the braking force produced, and a brake valve device for controlling the supply of fluid under pressure to said brake cylinder and centrifuge device.

2. In a vehicle brake apparatus, the combination with a brake cylinder, of a centrifuge decive controlled by fluid pressure, and a brake valve device operable to supply fluid under pressure to said brake cylinder when releasing fluid pressure from said centrifugal device.

3. In a vehicle brake apparatus, the combination with a brake cylinder, of a centrifuge device controlled by fluid pressure, and a brake valve device adapted to prevent fluid under pressure from being supplied to control said centrifuge device when supplied to said brake cylinder.

4. In a vehicle brake apparatus, the combination with a brake cylinder and a centrifuge device controlled by fluid pressure, of a brake valve device having release, supply and lap positions and operable to supply fluid under pressure to said centrifuge device in said release position and to release fluid pressure therefrom when said valve device is in supply and lap positions.

5. In a vehicle brake apparatus, the combination with a reservoir, a brake cylinder, and a centrifuge device having an auxiliary cylinder associated therewith, of a brake valve device for connecting said cylinders to said reservoir at different times.

6. In a vehicle brake apparatus, the combination with a reservoir, a brake cylinder, and a centrifuge device having a cylinder associated therewith, of a brake valve device operable to connect said cylinders to said reservoir, but preventing one of said cylinders being connected to said reservoir when the other of said cylinders is connected thereto.

7. In a brake apparatus, the combination with a brake device, of centrifuge operated means for actuating said device, and fluid pressure means for controlling said centrifuge device.

8. In a brake apparatus, the combination with a brake device, of means operable by the speed of the vehicle for actuating said brake device, and means operable by fluid under pressure for controlling said first means.

9. In a vehicle brake apparatus, the combination with a brake device, of fluid pressure means for operating said device, centrifuge means for also operating said device, and a brake valve device for controlling both of said means.

10. In a vehicle brake apparatus, the combination with a brake cylinder, of a centrifuge device, a second cylinder for controlling operation of said centrifuge device, and a brake valve device operable to supply fluid under pressure to said brake cylinder when releasing fluid pressure from said second cylinder.

11. In a vehicle brake apparatus, the combination with a brake cylinder, of a centrifuge device, a second cylinder for controlling operation of said centrifuge device, and a brake valve device operable to supply fluid under pressure to said second cylinder when releasing fluid pressure from said brake cylinder.

12. In a vehicle brake apparatus, the combination with a brake device having a brake cylinder, of a centrifuge device operable according to the speed of the vehicle, means responsive to operation of said centrifuge device for effecting operation of said brake device, a cylinder operable when fluid under pressure is supplied thereto for rendering said centrifuge device ineffective, and a brake valve device for controlling the supply of fluid under pressure to and its release from both of said cylinders.

13. In a vehicle brake apparatus, the combination with a brake device having a brake cylinder for operation thereof, of a centrifuge device operated according to the speed of the vehicle, a lever mechanism adapted to be operated by said centrifuge device to operate said brake device independent of operation of said brake cylinder, a second cylinder for controlling operation of said lever mechanism, and valve means controllable at the will of an operator for controlling the supply of fluid under pressure to both of said cylinders.

14. In a vehicle brake apparatus, the combination with a shaft rotatable according to the speed of the vehicle, of a brake drum secured to and rotating with said shaft, a friction brake element adapted to engage said drum, a brake cylinder for operating said friction brake element, centrifuge means disposed on said shaft, means actuated by said centrifuge means for also operating said friction brake element, a cylinder for controlling said last means, and a valve device for controlling the supply of fluid under pressure to and its release from both of said cylinders.

15. In a vehicle brake apparatus, the combination with a shaft rotatable according to the speed of the vehicle, of a brake drum secured to said shaft, a friction brake element adapted to be contracted to engage said drum to produce a braking effect thereon, a centrifuge device operatively associated with said shaft, and a lever mechanism operated by said centrifuge device for contracting said friction brake element into engagement with said drum.

16. In a vehicle brake apparatus, the combination with a vehicle motor having a shaft, of a brake drum secured to said shaft, a friction brake element adapted to engage said drum to produce a braking effect thereon, a brake cylinder for actuating said friction brake element into engagement with said drum, a centrifuge means disposed on said shaft, a lever mechanism operated by said centrifuge means for also actuating said friction brake element into engagement with said drum independent of operation of said brake cylinder, a second cylinder for controlling operation of said lever mechanism, and a brake valve device for controlling the supply of fluid under pressure to said brake cylinder and second cylinder and operable to release pressure from one of said cylinders when supplying fluid under pressure to the other of said cylinders.

GEORGE W. BAUGHMAN.